UNITED STATES PATENT OFFICE.

NATHANIEL B. POWTER, OF NEW YORK, N. Y., ASSIGNOR TO JOHN ORRETT, OF KINGSTON, JAMAICA, WEST INDIES.

PHOSPHATIC FERTILIZER.

SPECIFICATION forming part of Letters Patent No. 407,240, dated July 16, 1889.

Application filed March 2, 1888. Serial No. 265,939. (No specimens.)

*To all whom it may concern:*

Be it known that I, NATHANIEL B. POWTER, a subject of the Queen of Great Britain, residing in the city, county, and State of New York, have invented certain new and useful Improvements in Composition for Fertilizers, fully described and represented in the following specification.

My invention consists in a dry granular fertilizer compounded, without the use of artificial heat, by a mixture of sulphuric acid and wet animal matters in a given proportion with phosphatic rock, guano, or earth containing over ten per cent. of alumina or iron, such as is found in the Caymans Islands, Navassa, Redonda, Connetable, Aruba, St. Martin's, Alta Vela, and the Swan Islands, and others in the West Indies. Similar rocks are found in Estremadura, in Spain, and in some parts of Germany and other places.

In forming my improved composition for fertilizers the phosphatic material is powdered by any suitable means and mixed in suitable proportions with the desired quantity of acid and with the wet animal matter, such as undried meat, skin, blood, hair, or leather dissolved in acid, animal filth, refuse, or any liquids carrying the same, such as the water from the washing of slaughter-houses, from fat-rendering tanks, tanneries, and other sources. Tank-water—such as is derived from rendering-tanks—furnishes an example of one of the most offensive waste products of this class, and I will illustrate the formation of my fertilizing composition in its application to such liquid and to the phosphate rock or guano from the Caymans Islands, of the West Indies.

I take seven hundred and fifty pounds of tank-water with a specific gravity of $12\frac{1}{2}°$ Baumé and containing seventy-two per cent. of water, and mix therewith five hundred pounds of 60° sulphuric acid and one thousand pounds of the Grand Cayman phosphate rock or guano. I have found by experience that when these substances are mixed in substantially these proportions the composition will first form into a wet paste, then rapidly change into a stiff compound, and without artificial heat will, even when piled in a large heap, dry and granulate into a suitable condition to handle or barrel or transport in bulk as a merchantable fertilizer, and contains from ten to fifteen per cent. of phosphoric acid and two to three per cent. of ammonia.

The exact proportion of acid and wet animal matter in the composition may be slightly varied with the class of rock that is used, as the amount of such substances mixed with the rock depends upon the constitution of the same and the percentage of phosphate of alumina or phosphate of iron contained therein.

It is well known that undried meat, wet skin, blood, and such substances contain a proportion of water varying from forty to seventy-five per cent., so that the proportion of such substances that could be substituted for the tank-water in forming my fertilizing composition could be readily determined by any one practicing the operation, the function of such wet animal matter being merely to furnish the requisite percentage of nitrogen or ammonia in the fertilizer, which percentage may vary from two to seven per cent. in fertilizing compounds of different grades. By my invention I am enabled to utilize the nitrogen or ammonia in such waste animal products without the expense of artificially drying the same, and am also enabled to furnish the desired element of nitrogen or ammonia to the class of phosphate rocks referred to herein.

I hereby disclaim the treatment of phosphate rock with mineral acids, as that is already well known, and I also disclaim any of the compositions or processes in which phosphate rock destitute of alumina has been mixed with animal substances to form a fertilizer.

Heretofore the manufacture of fertilizers from the class of rock that I have described herein and which contains over ten per cent. of alumina or iron, or of a mixture of alumina and iron, has been exceedingly limited, because it has been found difficult and almost impossible to produce a dry fertilizer from such rocks without the use of artificial heat. By the use of the materials I have specified, in substantially the proportions named, I am enabled to produce a dry granular material by the mere mixture of the ingredients.

What I claim as my invention is—

A dry granular compound for fertilizers, composed of phosphatic rock or earth containing over ten per cent. of alumina or iron, sulphuric acid, and tank-water containing about twenty per cent. of animal matter, combined substantially in the proportions set forth.

In testimony whereof I have hereunto set my hand in the presence of two subscribing witnesses.

NATHANIEL B. POWTER.

Witnesses:
   THOS. S. CRANE,
   HENRY J. MILLER.